United States Patent
Pandy et al.

(10) Patent No.: US 11,897,562 B2
(45) Date of Patent: Feb. 13, 2024

(54) METHODS AND SYSTEMS FOR CONTROLLING A STEERING SYSTEM OF A VEHICLE

(71) Applicant: ZF Friedrichshafen AG, Friedrichshafen (DE)

(72) Inventors: Ananda Pandy, West Lafayette, IN (US); Pranav Salunke, West Lafayette, IN (US); Daniel Williams, Carmel, IN (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 352 days.

(21) Appl. No.: 17/308,194

(22) Filed: May 5, 2021

(65) Prior Publication Data

US 2022/0355858 A1 Nov. 10, 2022

(51) Int. Cl.
*B62D 6/10* (2006.01)

(52) U.S. Cl.
CPC ...................................... *B62D 6/10* (2013.01)

(58) Field of Classification Search
None
See application file for complete search history.

(56) References Cited

U.S. PATENT DOCUMENTS

| | | | |
|---|---|---|---|
| 9,821,817 B2* | 11/2017 | Desnoyer | B60W 50/14 |
| 2016/0001781 A1* | 1/2016 | Fung | G07C 9/37 |
| | | | 701/36 |
| 2019/0138003 A1* | 5/2019 | Ming | G05D 1/00 |
| 2019/0384323 A1* | 12/2019 | Kuroda | G05D 1/0274 |
| 2020/0074200 A1* | 3/2020 | Krishnan | G06F 18/214 |
| 2020/0079394 A1* | 3/2020 | Masuda | B60R 16/02 |
| 2020/0349477 A1* | 11/2020 | Birger | G06Q 10/06 |
| 2020/0393829 A1* | 12/2020 | O'Boyle | G06V 20/588 |
| 2021/0053591 A1* | 2/2021 | Kim | B60W 60/0059 |
| 2021/0221434 A1* | 7/2021 | Liu | B62D 15/025 |
| 2021/0253097 A1* | 8/2021 | Lacaze | G08G 1/22 |
| 2022/0315045 A1* | 10/2022 | Urano | B60W 60/005 |
| 2023/0016222 A1* | 1/2023 | Skrypchuk | B60W 50/14 |

\* cited by examiner

*Primary Examiner* — James M McPherson
(74) *Attorney, Agent, or Firm* — Dority & Manning, P.A.

(57) ABSTRACT

A method for controlling a steering system of a vehicle during an autonomous steering development mode may include performing, by one or more computing devices, high-authority autonomous steering control of a steering system of the vehicle. The method may further include receiving, by the one or more computing devices, an input from at least one sensor of the steering system indicative of manual operation of the steering system by an operator of the vehicle. Additionally, the method may include transitioning, by the one or more computing devices, from the high-authority autonomous steering control to a low-authority autonomous steering control of the steering system for a predetermined time period in response to receiving the input from the at least one sensor.

18 Claims, 6 Drawing Sheets

METHODS AND SYSTEMS FOR CONTROLLING A STEERING SYSTEM OF A VEHICLE

FIELD OF THE INVENTION

The present subject matter relates generally to systems and methods for controlling a steering system of a vehicle and, more particularly, to systems and methods for controlling a steering system of a vehicle when an autonomous steering development mode is enabled or disabled.

BACKGROUND OF THE INVENTION

Conventional vehicles generally include one or more motor systems, one or more transmission systems, and one or more braking systems which are controlled to change the speed and/or direction of the vehicle. Conventional vehicles may additionally include one or more steering systems manually controlled by a driver to change the heading of the vehicle. Vehicles with some level of autonomy may additionally be configured with sensors which provide feedback about the immediate environment of the vehicle (e.g., obstacles, lane markers, etc.), positioning sensors that give an indication of the position of the vehicle (e.g., GPS sensors, etc.), a navigation system that may generally be used to navigate the vehicle along a determined route, and an autonomous vehicle controller that may use input from the various sensors and/or navigation system to control the operation of the various systems with minimal driver interaction or without any driver interaction, completely autonomously.

One evaluation standard for autonomous vehicles is the number of miles or hours the vehicle operates without driver or other interference during an autonomous steering development mode. Typically, if driver input is detected during such autonomous steering development mode, the control mode of the vehicle is demoted from a high-autonomous steering control mode to a fully manual steering control mode. However, false indications of driver inputs may be detected when external inputs are applied from the wheels to the steering system. For instance, if wheels of the vehicle encounter a pothole or a bump, the wheels may turn, applying a torque on the steering system, which may be inferred by steering system sensors as an input by a driver. As such, the steering control mode of the vehicle may be demoted incorrectly. Similarly, lapses in communication and/or reduced performance of the steering system may automatically demote the control mode to the fully manual control mode. In addition to not counting miles or hours driven when operating in a manual control mode, autonomous steering control modes cannot be automatically resumed when conditions are no longer present after exiting to manual control. For instance, to resume the fully autonomous steering control mode, the vehicle might need to be fully stopped before being reconfigured by an operator to resume, which may be a time consuming process. As such, it would be beneficial to confirm the conditions of the vehicle before transitioning to the manual steering control mode, when possible.

The autonomous vehicle controller may experience similar conditions when operating while the autonomous steering development mode is disabled. However, a driver is not necessarily present when the autonomous steering development mode is disabled. As such, it would be beneficial to establish protocol for when manual input, lapses in communication, and/or reduced performance of the steering system is/are detected, so that a vehicle relies less on manual control outside of training.

Accordingly, improved systems and methods for controlling a steering system of a vehicle would be useful.

BRIEF DESCRIPTION OF THE INVENTION

Aspects and advantages of the invention will be set forth in part in the following description, or may be apparent from the description, or may be learned through practice of the invention.

The present subject matter relates generally to systems and methods for controlling a steering system of a vehicle during an autonomous steering development mode. In certain example embodiments, the systems and methods may detect a driver input, a loss in communication, and/or an internal fault while the autonomous steering development mode is enabled, and adjust a control mode of the steering system to a lower authority autonomous control mode or an advanced driver assist system control mode instead of a fully manual control mode whenever possible, e.g., to ensure that the autonomous steering development mode may occur quickly and with fewer instances where the vehicle needs to be reentered into autonomous mode from manual mode.

In example embodiment, a method for controlling a steering system of a vehicle during an autonomous steering development mode may include performing, by one or more computing devices, high-authority autonomous steering control of a steering system of the vehicle. The method according to the example embodiment may further include receiving, by the one or more computing devices, an input from at least one sensor of the steering system indicative of manual operation of the steering system by an operator of the vehicle. Additionally, the method may include transitioning, by the one or more computing devices, from the high-authority autonomous steering control to a low-authority autonomous steering control of the steering system for a predetermined time period in response to receiving the input from the at least one sensor.

In a first example aspect, the input from the at least one sensor is indicative of the operator contacting a steering wheel of the steering system or applying torque to the steering wheel.

In a second example aspect, an external input to one or more wheels of the vehicle is detected by the at least one sensor as an input indicative of manual operation of the steering system, the external input being applied by a surface across which the one or more wheels travels.

In a third example aspect, the method further includes transitioning, by the one or more computing devices, to the high-authority autonomous steering control from the low-authority autonomous steering control of the steering system when the predetermined time period elapses without receiving another request to exit autonomous steering control.

In a fourth example aspect, the method further includes exiting, by the one or more computing devices, the low-authority autonomous steering control and enabling manual steering control of a manual input device of the steering system when at least one of another input from the at least one sensor of the steering system indicative of manual operation of the steering system by an operator of the vehicle is received before the predetermined time period elapses or an input from a braking system of the vehicle is received.

In a fifth example aspect, the method further includes monitoring, by the one or more computing devices, a distance travelled by the vehicle only during high-authority autonomous steering control and during low-authority autonomous steering control.

In a sixth example aspect, a method for controlling a steering system of a vehicle during an autonomous steering development mode. The method may include performing, by one or more computing devices, high-authority autonomous steering control of a steering system of the vehicle. Further, the method may include receiving, by the one or more computing devices, a request to exit autonomous steering control. Additionally, the method may include transitioning, by the one or more computing devices, from the high-authority autonomous steering control to low-authority autonomous steering control of the steering system for a predetermined time period in response to receiving the request to exit autonomous steering control.

In a seventh example aspect, the method further includes monitoring, by the one or more computing devices, an actual performance of the steering system in comparison to an expected performance range of the steering system in response to a command by the autonomous controller during high-authority autonomous steering control, wherein the request to exit autonomous steering control is received in response to the actual performance of the steering system being outside of the expected performance range.

In an eighth example aspect, the method further includes exiting, by the one or more computing devices, the low-authority autonomous steering control and enabling manual steering control of a manual input device of the steering system when the predetermined time period elapses.

In a ninth example aspect, the method further includes detecting, by the one or more computing devices, a loss of communication with an external controller; and performing, by the one or more computing devices, a predetermined reaction based at least in part on the loss of communication.

In a tenth example aspect, the predetermined reaction comprises transitioning to the high-authority autonomous steering control from the low-authority autonomous steering control of the steering system, exiting the low-authority autonomous steering control and enabling manual steering control of a manual input device of the steering system, or transitioning from the high-authority autonomous steering control to a low-authority autonomous steering control of the steering system holding a last commanded steering position.

In an eleventh example aspect, a computing system for controlling a steering system of a vehicle during an autonomous steering development mode, the system including one or more processors, and one or more memory devices. The one or more memory devices store instructions that, when executed by the one or more processors, configure the computing system to perform high-authority autonomous steering control of a steering system of the vehicle. The instructions further configure the computing system to receive an input from at least one sensor of the steering system indicative of manual operation of the steering system by an operator of the vehicle. Additionally, the instructions configure the computing system to transition from the high-authority autonomous steering control to a low-authority autonomous steering control of the steering system for a predetermined time period in response to receiving the input from the at least one sensor.

In a twelfth example aspect, a vehicle may include the computing system for controlling a steering system of a vehicle during an autonomous steering development mode described above.

Each of the example aspects recited above may be combined with one or more of the other example aspects recited above in certain embodiments. For instance, all of the twelve example aspects recited above may be combined with one another in some embodiments. As another example, any combination of two to eleven of the twelve example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Example embodiments of the present disclosure are directed to systems and methods for controlling a steering system of a vehicle when an autonomous steering development mode is enabled or disabled. Specifically, in several embodiments, a steering system of a vehicle is configured to be controlled by a controller in accordance with several steering control modes, including at least a fully autonomous control mode, a semi-autonomous or advanced driver assist system (ADAS) control mode, and a fully manual control mode. Particularly, during autonomous control modes, the steering system operates with high-authority, where it is difficult for a driver to takeover steering control, or with low-authority, where it is easier for a driver to takeover steering control than with high-authority. When the steering system is controlled with a high-authority, it is determined whether a driver input is detected, a loss of communication with an external controller is detected, and/or an internal fault is detected. Depending on the duration and/or severity of the detected conditions and whether the autonomous steering development mode is enabled or disabled, it is determined whether steering control needs to be transitioned from the high-authority autonomous control to low-authority autonomous or if the level of autonomy needs to be demoted to a lower level of autonomy. For instance, in some cases, steering control is transitioned to a lower authority control mode for at least a given time period before potentially being transitioned to a fully manual control mode to either allow time to confirm that conditions detected are still present or allow time for an operator to react between fully autonomous and manual operating modes. Similarly, in some instances, steering control is transitioned to a lower level autonomous control mode (e.g., semi-autonomous or ADAS control mode), if possible, or is otherwise transitioned to the manual control mode. Accordingly, autonomous control modes are exited less frequently, which reduces the distance and time driven outside of autonomous control during training mode and reduces reliance on manual control outside of the training mode.

Figure 1:
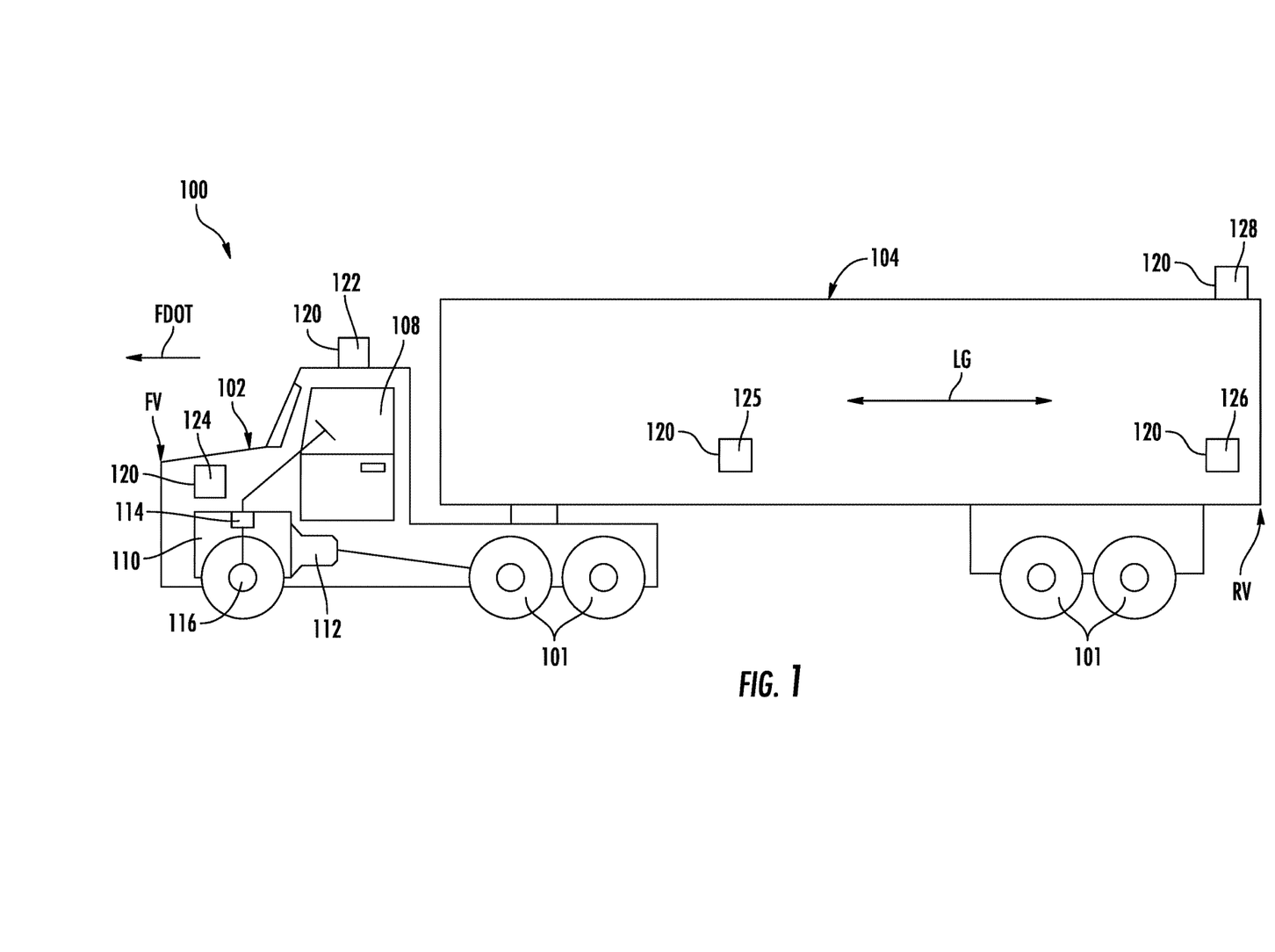
FIG. 1 is a side, elevation view of a commercial vehicle with a sensor system according to an example embodiment of the present subject matter.
Figure 2:
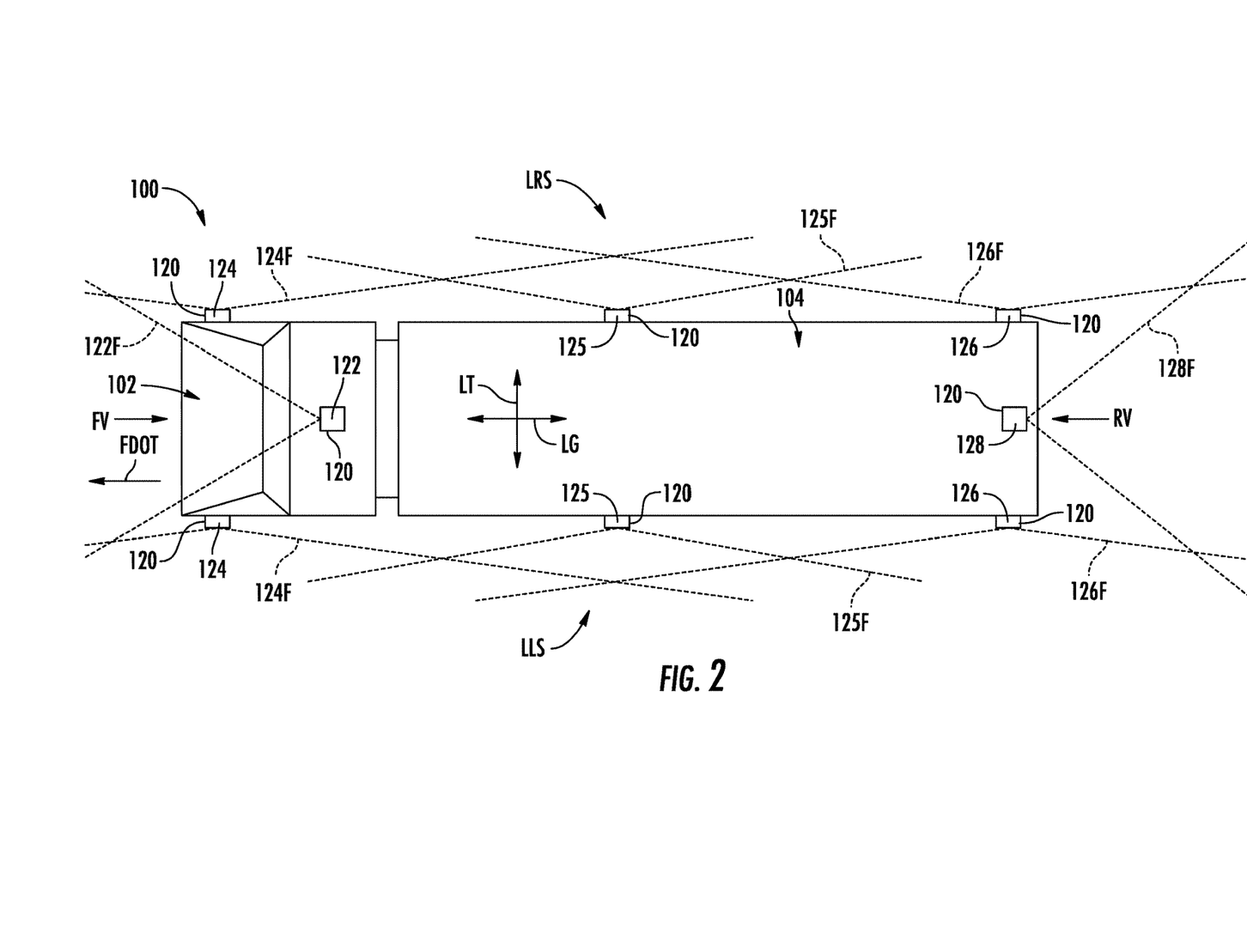
FIG. 2 is a top, plan view of the example commercial vehicle and the example sensor system of FIG. 1.

FIGS. 1 and 2 illustrate different views of a commercial vehicle 100 according to an example embodiment. For instance, FIG. 1 is a side, elevation view of commercial vehicle 100, and FIG. 2 is a top, plan view of commercial vehicle 100. As shown in FIGS. 1 and 2, commercial vehicle 100 includes a tractor 102 and a trailer 104 and is generally referred to as a "tractor-trailer truck." Commercial vehicle 100 is provided as an example only. For instance, commercial vehicle 100 may include one, two, or more additional trailers in alternative example embodiments. In addition, while described below in the context of commercial vehicle 100, it will be understood that the present subject matter may be used in or with any other suitable vehicle, including passenger vehicles, such as cars, vans, trucks, etc., or commercial vehicles, such as buses, box trucks, farm vehicles, construction vehicles, etc., in other example embodiments.

Commercial vehicle 100 may define a longitudinal direction LG and a lateral direction LT, which are perpendicular to each other. A front portion FV of commercial vehicle 100 and a rear portion RV of commercial vehicle 100 may be spaced apart from each other along the longitudinal direction LG. Thus, commercial vehicle 100 may extend between the front and rear portions FV, RV of commercial vehicle 100 along the longitudinal direction LG. Conversely, side portions of commercial vehicle 100 may be spaced apart from each other along the lateral direction LT. In particular, a left lateral side portion LLS of commercial vehicle 100 may be positioned opposite a right lateral side portion LRS of commercial vehicle 100 about the lateral direction LT. Thus, commercial vehicle 100 may extend between the left and right lateral side portions LLS, LRS of commercial vehicle 100 along the lateral direction LT.

Tractor 102 is pivotally connected to trailer 104 via a hitch 106 and is operative to tow trailer 104. Various items for transport may be stored within trailer 104. In alternative example embodiments, trailer 104 may be open, e.g., a flat bed, depending on items stored on trailer 104. Tractor 102 may include various components for towing trailer 104, including a motor system 110, a transmission system 112, a steering system 114, a braking system 116, etc. A rider may sit within a cab 108 of tractor 104 during operation. However, commercial vehicle 100 need not include seating within cab 108 or any cab 108 at all in certain example embodiments, e.g., when commercial vehicle 100 is configured for fully automated driving.

In general, motor system 110, transmission system 112, steering system 114, and braking system 116 may be configured in any conventional manner. For example, motor system 110 may generally include a suitable prime mover, such as an electric motor or internal combustion engine, that is operative to propel commercial vehicle 100. Motor system 110 may be disposed within tractor 102 and may be connected to transmission system 112. Transmission system 112 is disposed within power flow between motor system 110 and wheels 101 of commercial vehicle 100. Transmission system 112 is operative to provide various speed and torque ratios between an input and output of the transmission system 112. Thus, e.g., transmission system 112 may provide a mechanical advantage to assist propulsion of commercial vehicle 100 by motor system 110. Steering system 114 is operable to adjust the direction of travel of commercial vehicle 100. For instance, steering system 114 may be coupled to the front wheels 101 of commercial vehicle 100 and be operatable to turn the front wheels 101 in response to a driver of commercial vehicle turning a steering wheel within cab 108 and/or operation of a prime mover within steering system 114. Braking system 116 is operable to decelerate commercial vehicle 100. For instance, braking system 116 may include friction brakes configured to selectively reduce the rotational velocity of wheels 101. Braking system 116 may also be configured to as a regenerative braking system that converts kinetic energy of wheels 101 into electric current. Braking system 116 may include one or more braking sensors 116A configured to detect parameters associated with pressure applied to braking system 116, and/or other inputs/outputs of the braking system 116. Operation of motor system 110, transmission system 112, steering system 114, and braking system 116 is well known to those skilled in the art and not described in extensive detail herein for the sake of brevity.

Systems 110, 112, 114, 116 may further include any suitable sensors for detecting parameters associated with performance of such systems. For instance, steering system 114 may include one or more steering sensors 114A configured to detect parameters associated with a heading of commercial vehicle 100, torque applied to steering system 114, and/or other inputs/outputs of the steering system 114. For example, steering sensor(s) 114A may include one or more steering torque and angle sensors for detecting a magnitude and a direction of torque applied to steering system 114, one or more contact sensors for detecting an operator touching a steering wheel of commercial vehicle 100, and/or the like.

Commercial vehicle 100 also includes various components for fully autonomous and/or semi-autonomous operation. For instance, a plurality of sensors 120 may be positioned on tractor 102 and/or trailer 104. For example, the plurality of sensors 120 may include one or more front sensors 122, one or more front-side sensors 124, one or more mid-side sensors 125, one or more rear-side sensors 126, and/or one or more rear sensors 128. Front sensor(s) 122 may be positioned and oriented with a field of view directed forward of commercial vehicle 100 in order to detect an object(s) in front of commercial vehicle 100 relative to forward direction of travel FDOT, such as another vehicle travelling in front of commercial vehicle 100. For instance, as illustrated, front sensor 122 may be positioned on top of tractor 102 (e.g., on top of cab 108) or on top of trailer 104 (not shown), with a field of view 122F (FIG. 2) of the front sensor 122 directed forward of the commercial vehicle 100 relative to forward direction of travel FDOT. Similarly, side sensor(s) 124, 125, 126 may be positioned and oriented with a collective or overlapping field of view extending outwardly from the sides of commercial vehicle 100 in order to detect an object(s) at any position along the sides of commercial vehicle 100, such as another vehicle travelling at the side of commercial vehicle 100. For example, side sensor(s) 124, 125, 126 may be positioned at each side (e.g., left and right lateral side portions LLS, LRS in FIG. 2) of commercial vehicle 100 such that a respective field of view 124F, 125F, 126F (FIG. 2) of the side sensor(s) 124, 125, 126 is directed outwardly from the relative side. For instance, as illustrated, front-side sensors 124 may be positioned on tractor 102 at each side (e.g., left and right lateral side portions LLS, LRS) of commercial vehicle 100 proximate front portion FV of commercial vehicle 100 relative to forward direction of travel FDOT, mid-side sensors 125 may be positioned on trailer 104 at each side (e.g., left and right lateral side portions LLS, LRS) of commercial vehicle 100 proximate a middle portion of commercial vehicle 100 relative to forward direction of travel FDOT, and rear-side sensors 126 may be positioned on trailer 104 at each side (e.g., left and right lateral side portions LLS, LRS) of commercial vehicle 100 proximate rear portion RV of commercial vehicle 100 relative to forward direction of travel FDOT. Further, rear sensor(s) 128 may be positioned and oriented with a field of view 128F (FIG. 2) directed rearward of commercial vehicle 100 relative to forward direction of travel FDOT in order to detect an object(s) behind commercial vehicle 100, such as another vehicle travelling behind commercial vehicle 100. For example, as illustrated, rear sensor 128 may be positioned on top of trailer 104 (e.g., on a roof of trailer 104) proximate rear portion RV of commercial vehicle 100 relative to forward direction of travel FDOT, or on the rear portion of trailer 104 (not shown) relative to forward direction of travel FDOT, with field of view 128F (FIG. 2) of rear sensor 128 being directed rearward of the commercial vehicle 100 relative to forward direction of travel FDOT. It will be understood that the positions of sensors 120 is provided by way of example only and alternative positions may be used to provide similar coverage. The respective field of view for each sensor 120 is generally indicated with the dashed lines extending from the sensor 120 in FIG. 2.

It should be appreciated that the sensors 120 may be configured as any suitable sensor for detecting object(s) adjacent or around commercial vehicle 100. For instance, each sensor 120 may include one or more of a LiDAR sensor unit, a radar sensor unit, a camera unit (e.g., optical or infrared), an acoustic sensor unit (e.g., microphone or sonar-type sensor), an inertial sensor unit (e.g., accelerometer or gyroscope), etc. It should further be appreciated that sensors 120 may include a first set of sensors 120A provided for use with autonomous control modes and a second set of sensors 120B provided for use with semi-autonomous or ADAS control modes as will be discussed below in greater detail. In some embodiments, first set of sensors 120A may include higher quality sensors (e.g., HDR cameras, etc.) in comparison to second set of sensors 120B which allows for higher levels of autonomy. For instance, first set of sensors 120A may be used to better detect pedestrians over second set of sensors 120B. In some embodiments, the first and second sets of sensors 120A, 120B each include the sensor(s) 122, 124, 125, 126, 128. However, first and second sets of sensors 120A, 120B may, in some embodiments, include different combinations of the sensor(s) 122, 124, 125, 126, 128.

Figure 3:
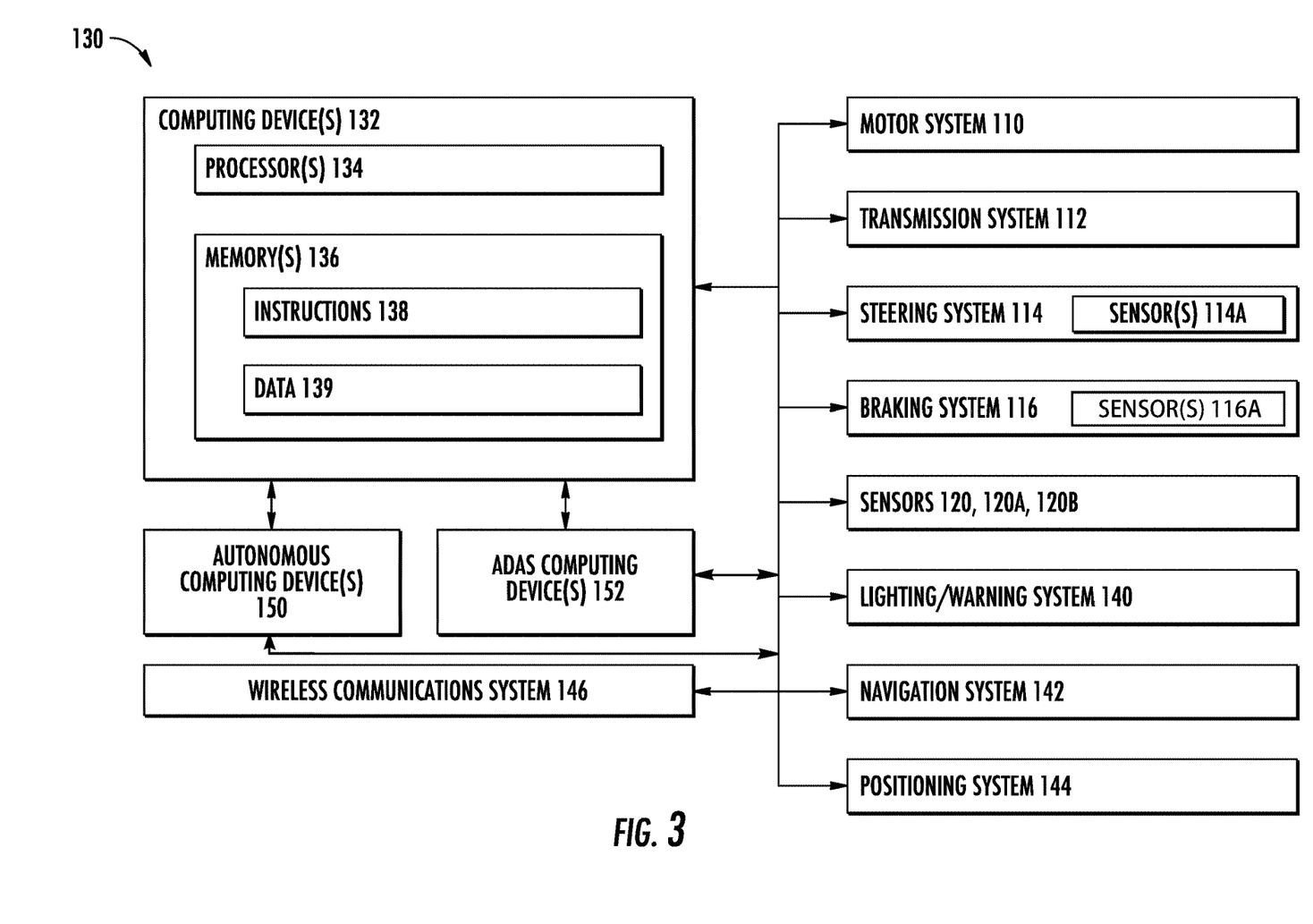
FIG. 3 is a schematic view of an example control system of the commercial vehicle of FIG. 1 according to an example embodiment of the present subject matter.

FIG. 3 is a schematic view of certain components of a control system 130 suitable for use with commercial vehicle 100. In general, control system 130 is configured to control operation of commercial vehicle 100 and components therein. Control system 130 may facilitate operation of commercial vehicle 100 in a fully autonomous and/or semi-autonomous mode of operation. For instance, control system 130 may be configured to operate commercial vehicle 100 in any of the levels defined by the U.S. National Highway Traffic Safety Administration and the Society of Automotive Engineers for defining the degree of control exercised by control system 130 to drive commercial vehicle 100. Level 0 has no automation, and the human driver makes all driving-related decisions; Level 1 is a semi-autonomous mode and includes some driver assistance, such as cruise control; Level 2 includes autonomous control of certain driving operations; Level 3 includes conditional automation that allows a human driver to selectively take control; Level 4 is a highly automated mode in which the commercial vehicle 100 is drivable without human assistance in certain conditions; and Level 5 is a fully autonomous mode in which the commercial vehicle 100 is drivable without human assistance in all situations. The present subject matter is operable to assist operation of commercial vehicle 100 in any of the semi-autonomous or fully autonomous modes described above, e.g., any of Levels 1-5, which is generally referred to herein as "autonomous" operation. Thus, as used herein, the term "autonomous" includes both semi-autonomous and fully autonomous operation, except when expressly indicated otherwise.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of tractor 102. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors, including sensors 114A, 120. In FIG. 3, the processor(s) 134, memory(ies) 136, and other elements of computing device(s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Computing device(s) 132 may be configured for communicating with various components of commercial vehicle 100. For example, computing device(s) 132 may be in operative communication with various systems of commercial vehicle 100, including motor system 110, transmission system 112, steering system 114, and braking system 116. For instance, computing device(s) 132 may particularly be in operative communication with an engine control unit (ECU) 111 (not shown) of motor system 110 and a transmission control unit (TCU) 113 (not shown) of transmission system 112. Computing device(s) 132 may also be in operative communication with other systems of commercial vehicle 100, including a lighting/warning system 140 (for controlling horns, headlights, taillights, and/or turn signals of commercial vehicle 100), a navigation system 142 (for navigating commercial vehicle 100 to a destination), and/or a positioning system 144 (for determining a current location (e.g., GPS coordinates) of commercial vehicle 100). Computing device(s) 132 may be configured to control system(s) 110, 112, 114, 116, 140 based at least in part on inputs received from an operator via a user interface (not shown), which may include one or more of a steering wheel, a gas pedal, a clutch pedal, a brake pedal, turn signal lever, hazard light switch, and/or the like. Alternatively, computing device(s) 132 may be configured to at least partially control system(s) 110, 112, 114, 116, 140 based at least in part on inputs received from sensors 120, navigation system 142, and positioning system 144.

For instance, control system 130 may particularly include one or more autonomous computing devices 150 and one or more ADAS computing devices 152 in communication with computing device(s) 132, where computing device(s) 150, 152 are configured to control operation of system(s) 110, 112, 114, 116, 140 of commercial vehicle 100 using some level of automation. For example, autonomous computing device(s) 150 may be configured to autonomously control operations of the various components of commercial vehicle 100. Similarly, advanced driver assist system (ADAS) computing device(s) 152 may be configured to semi-autonomously control operations of the various components of commercial vehicle 100. Computing device(s) 150, 152 may be configured to control the direction and/or speed of commercial vehicle 100 by controlling the various components of commercial vehicle 100, such as motor system 110, transmission system 112, steering system 114, and braking system 116 (e.g., via computing device(s) 132). For instance, autonomous computing device(s) 150 may navigate commercial vehicle 100 to a destination autonomously using data from navigation system 142 and/or positioning system 144. Autonomous computing device(s) 150 may use positioning system 144 to determine the current location of commercial vehicle 100 and sensors 120 to detect and navigate objects in order to reach the destination. Similarly, computing system(s) 152 may provide lane keeping and/or centering using data from sensors 120 and/or positioning system 144, and/or may provide cruise control features. During travel, autonomous computing device(s) 150, 152 may selectively accelerate commercial vehicle (e.g., by throttling or energizing motor system 110), selectively decelerate commercial vehicle (e.g., by throttling motor system 110, changing gears within transmission system 112, and/or actuating braking system 116), and change the direction of travel for commercial vehicle 100 (e.g., by turning the front wheels 101 of commercial vehicle 100 with steering system 114).

Navigation system 142 may be used by autonomous computing device(s) 150 to determine and follow a route to a destination. Moreover, navigation system 142 and/or data 139 may store map information that computing device(s) 132, 150, 152 may utilize to navigate and/or control commercial vehicle 100. As an example, such maps within navigation system 142 and/or data 139 may include or be used to determine the shape and elevation of roadways, types of lane markers, intersection locations, crosswalks locations, speed limits, traffic light locations, building locations, sign types and locations, traffic information, etc. The lane markers may include features such as a single solid line, a single dashed line, double solid lines, double broken lines, a combination of a single solid line and single broken line, a curb, etc. Each lane is generally bounded by a left edge lane line and an opposite right edge lane line.

Sensors 120 may be used to detect external objects, such as other vehicles, obstacles in the roadway, lane markers, traffic signals, signs, trees, etc. Signals and data from sensors 120 may be received by control system 130 and/or stored within the one or more memories 136. For instance, sensors 120 may record data for processing by computing device(s) 132, 150, 152. Sensors 120 may detect objects and characteristics of the objects, such as location, orientation, size, shape, type, heading, velocity, acceleration, etc. The raw data from the sensors, such as LiDAR point clouds, and/or the aforementioned characteristics can be sent for further processing to the computing device(s) 132, 150, 152 periodically or continuously. Computing device(s) 132, 150, 152 may use signals from sensors 120 to detect and navigate around objects while commercial vehicle 100 is operating autonomously. Particularly, as indicated above, in some embodiments, sensors 120 includes first set of sensors 120A configured for use with autonomous computing device(s) 150 and second set of sensors 120B may be configured for use with ADAS computing device(s) 152. More particularly, first set of sensors 120A may provide autonomous sensor data configured to be analyzed by the autonomous computing device(s) 150. Similarly, second set of sensors 120B may provide ADAS sensor data configured to be analyzed by ADAS computing device(s) 152.

While not shown, it should be appreciated that computing device(s) 150, 152 may include suitable processor(s) and memory(s) similar to computing device(s) 132 which enable the computing device(s) 150, 152 to control operation of the various systems within control system 130 as described above.

Control system 130 may also include a wireless communication system 146 assists with wireless communication with other systems. For instance, wireless communication system 146 may wirelessly connect control system 130 with one or more other vehicles, buildings, etc. directly or via a communication network. Wireless communication system 146 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132, 150, 152 and the system(s) 110, 112, 114, 116, 120, 140, 142, 144, 146 within commercial vehicle 100 may be wired and/or wireless.

Figure 4A:
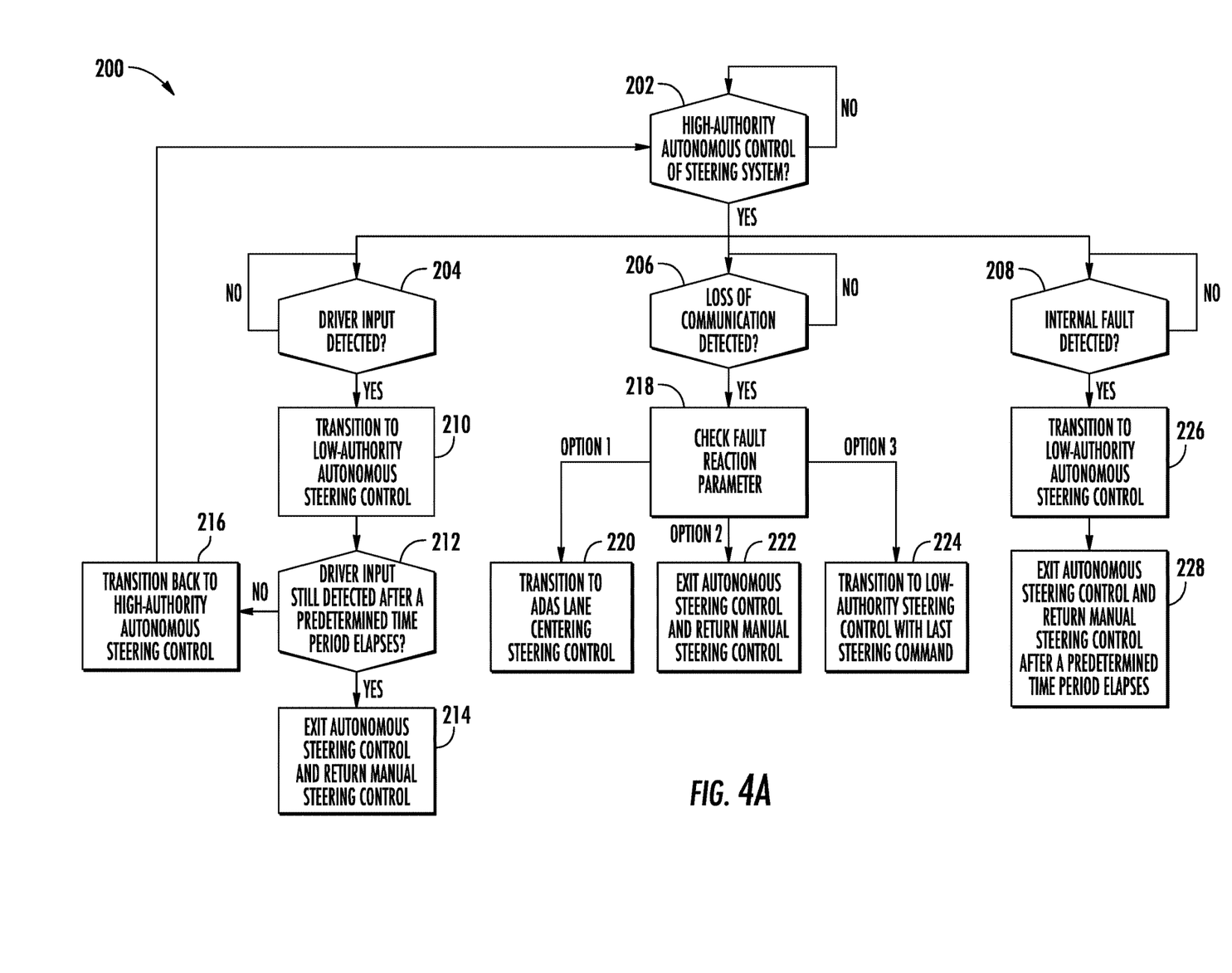
FIG. 4A is a flow diagram of a control algorithm for controlling a steering system of a vehicle when an autonomous steering development mode is enabled according to an example embodiment of the present subject matter.
Figure 4B:
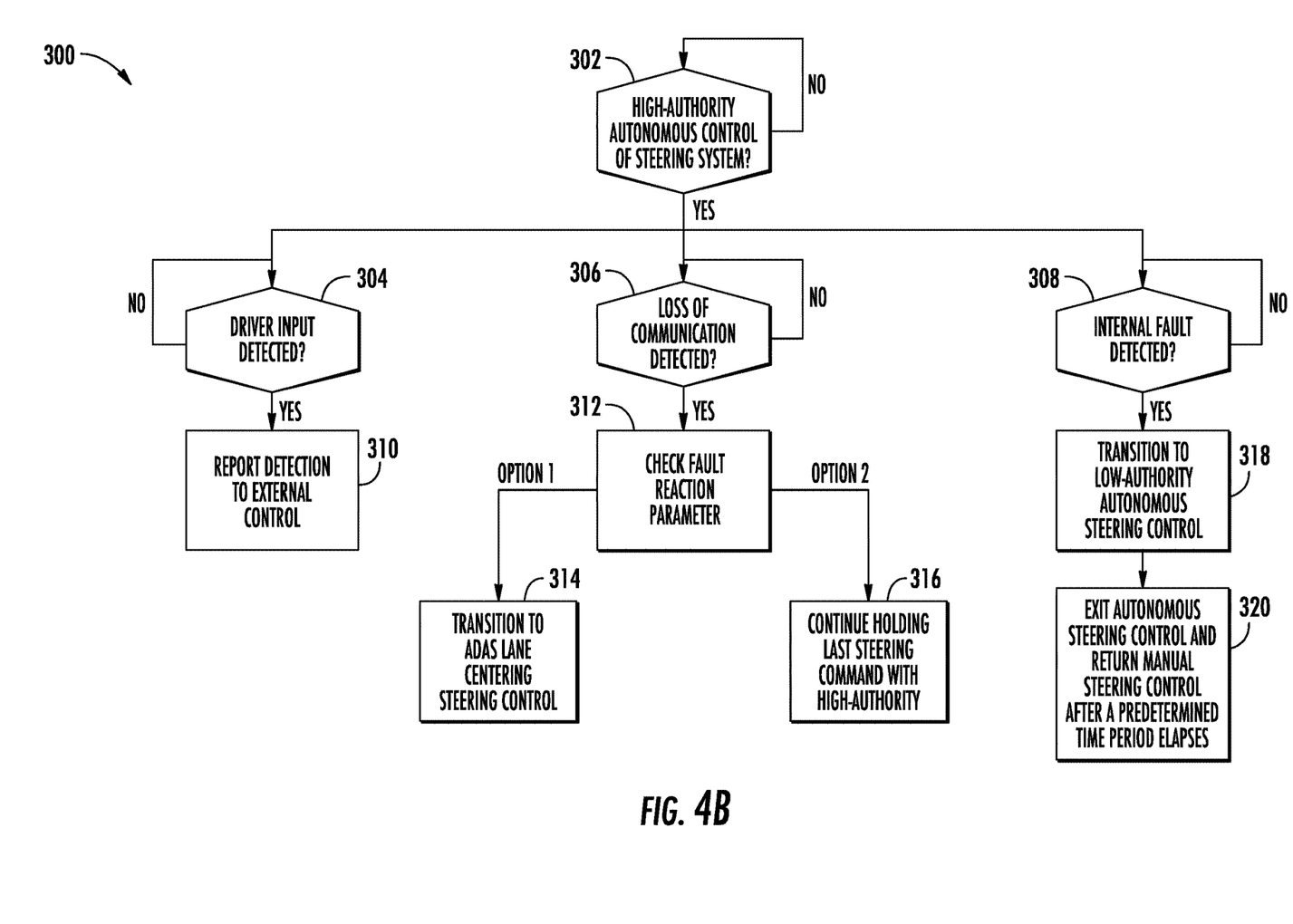
FIG. 4B is a flow diagram of another control algorithm for controlling a steering system of a vehicle when an autonomous steering development mode is disabled according to an example embodiment of the present subject matter.

Referring now to FIGS. 4A and 4B, flow diagrams of different embodiments of control algorithms for controlling a steering system of a vehicle are illustrated. For instance, FIG. 4A illustrates a flow diagram of one embodiment of a control algorithm 200 for controlling a steering system of a vehicle when an autonomous steering development mode is enabled. Similarly, FIG. 4B illustrates a flow diagram of one embodiment of a control algorithm 300 for controlling a steering system of a vehicle when an autonomous steering development mode is disabled. Control algorithms 200, 300 will generally be described with reference to commercial vehicle 100 described with reference to FIGS. 1 and 2, and control system 130 described with reference to FIG. 3. For instance, control algorithms 200, 300 may be executed by computing device(s) 132, 150, 152 of control system 130 to control steering system 114 of commercial vehicle 100. However, control algorithms 200, 300 may be suitable for use with any other suitable type of vehicle, control system configuration, and/or vehicle system. In addition, although FIGS. 4A and 4B depict steps performed in a particular order for purposes of illustration and discussion, the algorithms discussed herein are not limited to any particular order or arrangement. One skilled in the art, using the disclosures provided herein, will appreciate that various steps of the algorithms disclosed herein can be omitted, rearranged, combined, and/or adapted in various ways without deviating from the scope of the present disclosure.

As described above, autonomous control of steering system 114 may undergo development and testing while an autonomous steering development mode is enabled, during which the distance and/or time driven autonomously without requiring interruption by a driver or other source is monitored. As shown in FIG. 4A, when the autonomous steering development mode is enabled, such as with Level 4 or 5 autonomy, it is determined, at (202), whether steering system 114 is controlled using a high-authority autonomous control mode. More particularly, it is determined whether steering system 114 is controlled by control system 130 (e.g., by autonomous computing device(s) 150) in a manner associated with high-authority autonomous control such that it is difficult for a driver to takeover command of steering system 114. Once it is determined that steering system 114 is controlled with high-authority autonomous steering control at (202), it is simultaneously determined or monitored, at (204), whether a driver input is detected, at (206), if loss of communication is detected, and/or, at (208), whether an internal fault is detected.

With reference to detecting a driver input at (204), a driver input may be detected when steering sensor(s) 114A generates data indicative of a driver touching the steering wheel and/or data indicative of a torque applied to steering system 114 not initiated by control system 130. For instance, torque applied to steering system 114 that is not initiated by control system 130 (e.g., by autonomous computing device(s) 150) may be applied by a driver (e.g., on the steering wheel) or by an external force or input applied to one or more wheels 101 by a surface across which the wheel(s) 101 travels. For example, wheel(s) 101 may turn when encountering a pothole or a bump in the road, which is falsely detected by the sensor(s) 114A as a driver input. Once a driver input is detected at (204), steering system 114 is transitioned, at (210), into being controlled by control system 130 with a low-authority autonomous steering control. More particularly, the steering system 114 is controlled by control system 130 (e.g., by autonomous computing device(s) 150) in a manner associated with the low-authority autonomous control mode such that it is easier for a driver to takeover command of steering system 114 than when in the high-authority autonomous control mode, and while maintaining the previously commanded level of autonomy (e.g., Level 4 or 5).

Thereafter, at (212), it is determined whether driver input is still detected after a predetermined time period elapses. More particularly, when the driver input detected at (204) is still detected or when another driver input from steering sensor(s) 114A is detected before a predetermined time period elapses or an input from braking system 116 (e.g., from braking sensors 116A) of the vehicle is received, the driver input detected at (204) is inferred as being intended, otherwise the driver input detected at (204) is inferred as being unintentional. Accordingly, at (214), when driver input is detected at (212) before the predetermined time period elapses, autonomous steering control of steering system 114 (e.g., by autonomous computing device(s) 150) is exited and manual steering control (Level 0 autonomy) of steering system 114 is returned to a driver. Alternatively, at (216), when driver input is not detected at (212) before the predetermined time period elapses, steering system 114 is automatically transitioned back into being controlled by control system 130 (e.g., by autonomous computing device(s) 150) with high-authority autonomous steering control of the previously commanded level of autonomy (e.g., Level 4 or 5 autonomy). Unlike transitioning from manual to autonomous control, transitioning between high-authority and low-authority autonomous control modes maintains the level of autonomy and does not require manual reconfiguration. It should be appreciated that the predetermined time period may be predetermined and stored within memory(s) 136 or may be selected in any other suitable manner. In certain example embodiments, the predetermined time period may be a quarter of a second (0.25), a half second (0.5 s), one second (1 s), etc.

With reference to detecting loss of communication at (206), loss of communication between steering system 114 and the autonomous computing device(s) 150 may be directly detectable. If such loss of communication is detected at (206), then, at (218), a fault reaction parameter is checked or determined. For instance, the appropriate reaction for the detected type of communication loss may be determined at (218). The fault reaction parameters may, in some instances, be predetermined and stored within the control system 130. Once the appropriate fault reaction parameter is established at (218), the control mode of steering system 114 may be adjusted according to the fault reaction parameter. For instance, at (220), control of steering system 114 is transitioned from high-authority autonomous steering control (e.g., by autonomous computing device(s) 150) to ADAS lane centering steering control (e.g., by ADAS computing device(s) 152). ADAS lane centering steering control may be associated with Level 1, semi-autonomous control modes where inputs from sensors 120 (e.g., second set of sensors 120B) are used to control steering system 114 to estimate commands, for instance, to keep commercial vehicle 100 within its lane. Alternatively, at (222), control of steering system 114 is transitioned from autonomous steering control (e.g., by autonomous computing device(s) 150) to manual steering control (e.g., Level 0 autonomy). Otherwise, at (224), control of steering system 114 is transitioned from the high-authority autonomous steering control to low-authority autonomous steering control of the same level of autonomy and steering system 114 is continued to be controlled (e.g., by autonomous computing device(s) 150) to follow the last steering command. For instance, if the last steering command was to make a right turn, the autonomous computing device(s) 150 continues to control steering system 114 to turn right.

With reference to detecting an internal fault at (208), an internal fault may be detected if there is a difference between a commanded or expected performance of steering system 114 and an actual performance of steering system 114 in response to the commanded performance. For instance, if steering system 114 is commanded by control system 130 to adjust a heading of commercial vehicle 100 from a first heading to a second heading, but the actual heading of commercial vehicle 100 does not change from the first heading or does not come within an expected performance range of the second heading within a particular time frame, an internal fault may be detected. Once an internal fault is detected at (208), at (226), steering system 114 is transitioned into being controlled by control system 130 with low-authority autonomous steering control of the same commanded level of autonomy (e.g., Level 4 or 5). Then, at (228), autonomous steering control of steering system 114 is exited and manual steering control (e.g., Level 0 autonomy) of steering system 114 is enabled after a predetermined time period elapses. Accordingly, the steering system 114 is still controlled to try to complete the demanded control until a driver takes over or at least until the period of time elapses. Again, such period of time may be predetermined and stored within memory(s) 136 or may be selected in any other suitable manner.

It should be appreciated that control system 130 may be configured to monitor the distance (e.g., miles, kilometers, etc.) or time (e.g., days, hours, minutes, etc.) driven only under autonomous steering control modes (e.g., during high-authority autonomous control and low-authority autonomous control) while the autonomous steering development mode is enabled. With control algorithm 200, fully manual control of steering system 114 is not automatically entered upon detection of operator input, loss of communication, or internal faults, which reduces the distance or time that steering system 114 is operated non-autonomously during development mode.

As discussed above, when the autonomous steering development mode is disabled, it is preferred to rely upon manual steering control as infrequently as possible. For instance, as shown in FIG. 4B, when the autonomous steering development mode is disabled, it is determined, at (302), whether steering system 114 is controlled using a high-authority autonomous control mode. More particularly, it is determined whether steering system 114 is controlled by control system 130 (e.g., autonomous computing device(s) 150 during Level 4 or 5 autonomy) using the high-authority autonomous control mode. Once it is determined that steering system 114 is controlled with high-authority autonomous control, it is simultaneously determined or monitored, at (304), whether a driver input is detected, at (306), if loss of communication is detected, and/or, at (308), whether an internal fault is detected.

Similar to as discussed above, a driver input is detected at (304) when steering sensor(s) 114A generates data indicative of a driver touching the steering wheel and/or data indicative of a torque applied to steering system 114 not initiated by control system 130. For instance, torque not initiated by control system 130 (e.g., by autonomous computing device(s) 150) may be applied by a driver on the steering wheel or by an external force or input applied to one or more wheels 101 by a surface across which the wheel(s) 101 travels. For example, when wheel(s) 101 encounter a pothole or bump in the road, the wheel(s) 101 may turn which is detected by the sensor(s) 114A as a driver input. Once a driver input is detected at (304), at (310), the detection is reported to the external controller (e.g., autonomous computing device(s) 150) and steering system 114 continues to be controlled with high-authority autonomous control.

As described above, loss of communication between steering system 114 and autonomous computing device(s) 150, may be directly detected. If such loss of communication is detected at (306), then, at (312), a fault reaction parameter is checked or determined. For instance, the appropriate reaction for the detected type of communication loss may be determined at (312). The fault reaction parameters may be predetermined and stored within the control system 130. Once the fault reaction parameter is established at (312), the control mode of steering system 114 may be adjusted according to the fault reaction parameter. For instance, at (314), control of steering system 114 is transitioned from high-authority autonomous steering control (e.g., by autonomous computing device(s) 150) to ADAS lane centering steering control (e.g., by ADAS computing device(s) 152). As described above, ADAS lane centering steering control may be associated with Level 1 autonomy where inputs from sensors 120 (e.g., second set of sensors 120B) are used to control steering system 114 to estimate commands, for example, to keep commercial vehicle 100 within its lane. Alternatively, at (316), control of steering system 114 with high-authority autonomous steering control is maintained and the last steering command is continued to be held.

As indicated above, an internal fault may be detected if there is a difference between a commanded or expected performance of steering system 114 and an actual performance of steering system 114 in response to the commanded performance. For example, if steering system 114 is commanded by control system 130 to adjust a heading of commercial vehicle 100 from a first heading to a second heading, but the actual heading of commercial vehicle 100 does not change from the first heading or does not come within an expected performance range of the second heading within a particular time frame, an internal fault may be detected. Once an internal fault is detected at (308), at (318), steering system 114 is transitioned into being controlled by control system 130 with a low-authority autonomous steering control of the previously commanded level of autonomy (e.g., Level 4 or 5 autonomy). Then, at (320), autonomous steering control of steering system 114 is exited and manual steering control (e.g., Level 0 autonomy) of steering system 114 is enabled after a predetermined time period elapses.

Thus, with control algorithm 300, fully manual operation of steering system 114 is only provided if an internal fault is detected, which reduces overall dependence on drivers outside of autonomous development mode.

Figure 5:
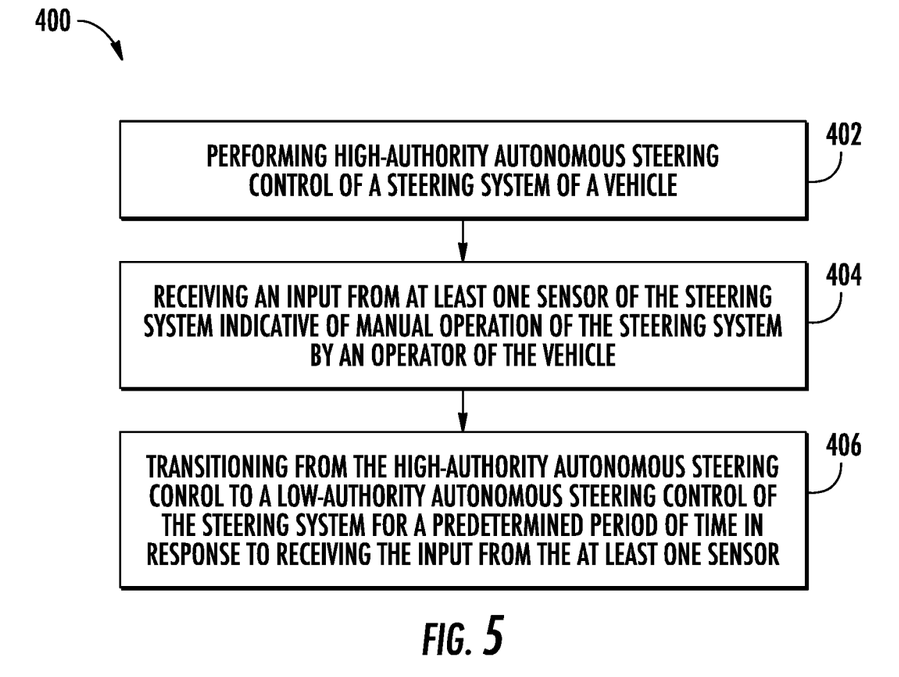
FIG. 5 is a flow diagram of a method for controlling a steering system of a vehicle according to an example embodiment of the present subject matter.

Referring now to FIG. 5, a flow diagram of one embodiment of a method 400 for controlling a steering system of a vehicle is illustrated. In general, the method 400 will be described herein with reference to commercial vehicle 100 described with reference to FIGS. 1 and 2, control system 130 described with reference to FIG. 3, steering system 114 described with reference to FIG. 3, and control algorithm 200 described with reference to FIG. 4A. However, it should be appreciated that the disclosed method 400 may be used with any other suitable vehicle, control system, steering system, and/or control algorithms. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), method 400 may include performing high-authority autonomous steering control of a steering system of a vehicle. For instance, as indicated above, steering system 114 of commercial vehicle 100 may be controlled by control system 130 (e.g., with a Level 4 or 5 autonomy by autonomous computing device(s) 150) with high-authority autonomous steering control during an autonomous steering development mode.

Further, at (404), method 400 may include receiving an input from at least one sensor of the steering system indicative of manual operation of the steering system by an operator of the vehicle. For example, as discussed above, an input may be received from steering sensor(s) 114A indicative of an operator touching a steering wheel of commercial vehicle 100 and/or of an operator applying torque to steering system 114. Such inputs may be detected by sensor(s) 114A in response to actual input from an operator on steering wheel or falsely, in response to external inputs applied on the wheels (e.g., by a pothole or bump in driving surface) that cause torque to be applied to steering system (114).

Additionally, at (406), method 400 may include transitioning from the high-authority autonomous steering control to a low-authority autonomous steering control of the steering system for a predetermined time period in response to receiving the input from the at least one sensor. For instance, as discussed above, control system 130 may be demoted from controlling steering system 114 with high-authority autonomous steering control to low-authority autonomous steering control of the same level of autonomy (e.g., Level 4 or 5) for a predetermined time period in response to receiving the input from steering sensor(s) 114A.

Figure 6:
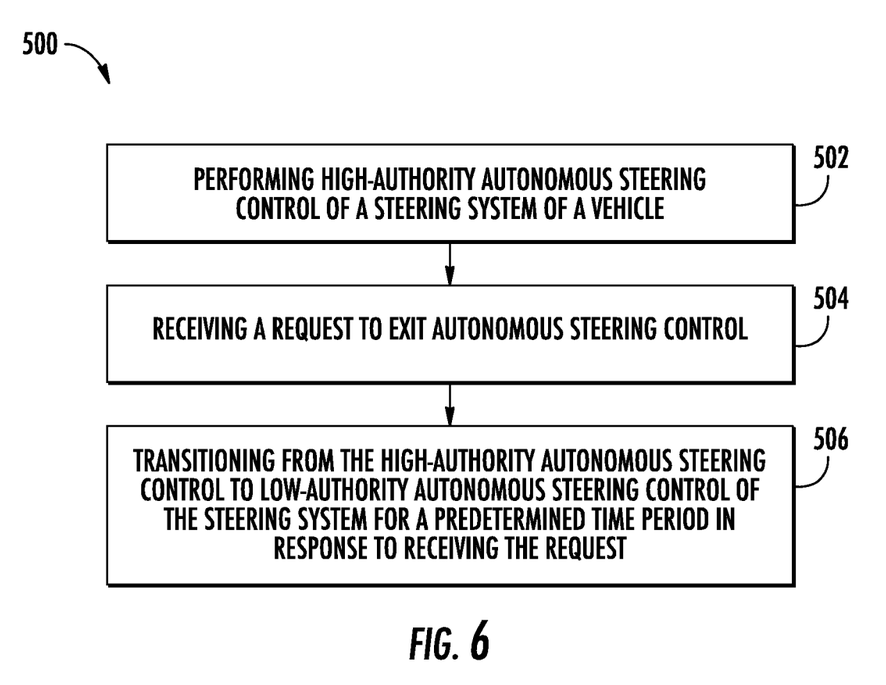
FIG. 6 is a flow diagram of another method for controlling a steering system of a vehicle according to an example embodiment of the present subject matter.

Referring now to FIG. 6, is a flow diagram of another embodiment of a method 500 for controlling a steering system of a vehicle is illustrated. In general, the method 500 will be described herein with reference to commercial vehicle 100 described with reference to FIGS. 1 and 2, control system 130 described with reference to FIG. 3, steering system 114 described with reference to FIG. 3, and control algorithm 200 described with reference to FIG. 4A. However, it should be appreciated that the disclosed method 500 may be used with any other suitable vehicle, control system, steering system, and/or control algorithms. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (502), method 500 may include performing high-authority autonomous steering control of a steering system of a vehicle. For instance, as indicated above, steering system 114 of commercial vehicle 100 may be controlled by control system 130 (e.g., with Level 4 or 5 autonomy by autonomous computing device(s) 150) with high-authority autonomous steering control during an autonomous steering development mode.

Further, at (504), method 500 may include receiving a request to exit autonomous steering control. For example, as discussed above, a request to exit autonomous steering control may include an input received from steering sensor(s) 114A indicative of an operator touching a steering wheel of commercial vehicle 100 and/or of an operator applying torque to steering system 114. Such inputs may be detected by sensor(s) 114A in response to actual contact or torque applied by an operator on steering wheel or falsely, in response to external inputs applied on the wheels (e.g., by a pothole or bump in driving surface) that cause torque to be applied to steering system (114). Alternatively, or additionally, such request to exit autonomous control may be received in response to an internal fault being detected which reduces the performance of steering system 114A (e.g., in adjusting heading direction).

Additionally, at (506), method 500 may include transitioning from the high-authority autonomous steering control to low-authority autonomous steering control of the steering system for a predetermined time period in response to receiving the request to exit autonomous steering control. For instance, as discussed above, control system 130 may be demoted from controlling steering system 114 with high-authority autonomous steering control to low-authority autonomous steering control of the same level of autonomy (e.g., Level 4 or 5 autonomy) for a predetermined time period in response to operator input being indicated or an internal fault being detected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Commercial vehicle
101 Wheels
102 Tractor
104 Trailer
110 Motor system
112 Transmission system
114 Steering system
114A Steering sensors
116 Braking system
116A Braking sensors
120 Sensors
120A First set of sensors
120B Second set of sensors
122 Front sensor
122F Field of view
124 Front-side sensors
124F Field of view
125 Mid-side sensors
125F Field of view
126 Rear-side sensors
126F Field of view
128 Rear sensor
128F Field of view
130 Control system
132 Computing devices
134 Processors
136 Memories
138 Instructions
139 Data
140 Lighting/warning system
142 Navigation system
144 Positioning system
146 Wireless communications system
150 Autonomous computing devices
152 ADAS computing devices
200 Control algorithm
300 Control algorithm
400 Method
500 Method
FDOT Forward direction of travel
LG Longitudinal direction
LT Lateral direction

What is claimed is:

1. A method for controlling a steering system of a vehicle during an autonomous steering development mode, comprising:
performing, by one or more computing devices, high-authority autonomous steering control of a steering system of the vehicle, the high-authority autonomous steering control preventing an operator from directly taking over steering control;
receiving, by the one or more computing devices, an input from at least one sensor of the steering system indicative of manual operation of the steering system by an operator of the vehicle;
transitioning, by the one or more computing devices, from the high-authority autonomous steering control to a low-authority autonomous steering control of the steering system for a predetermined time period in response to receiving the input from the at least one sensor, the low-authority autonomous steering control allowing an operator to directly take over steering control; and
exiting, by the one or more computing devices, the low-authority autonomous steering control and enabling manual steering control of a manual input device of the steering system when at least one of another input from the at least one sensor of the steering system indicative of manual operation of the steering system by an operator of the vehicle is received before the predetermined time period elapses or an input from a braking system of the vehicle is received.

2. The method of claim 1, wherein the input from the at least one sensor is indicative of the operator contacting a steering wheel of the steering system or applying torque to the steering wheel.

3. The method of claim 2, wherein an external input to one or more wheels of the vehicle is detected by the at least one sensor as an input indicative of manual operation of the steering system, the external input being applied by a surface across which the one or more wheels travels.

4. The method of claim 1, further comprising transitioning, by the one or more computing devices, to the high-authority autonomous steering control from the low-authority autonomous steering control of the steering system when the predetermined time period elapses without receiving another request to exit autonomous steering control.

5. The method of claim 1, further comprising monitoring, by the one or more computing devices, a distance travelled by the vehicle only during high-authority autonomous steering control and during low-authority autonomous steering control.

6. A method for controlling a steering system of a vehicle during an autonomous steering development mode, comprising:
performing, by one or more computing devices, high-authority autonomous steering control of a steering system of the vehicle, the high-authority autonomous steering control preventing an operator from directly taking over steering control;
receiving, by the one or more computing devices, a request to exit autonomous steering control;
transitioning, by the one or more computing devices, from the high-authority autonomous steering control to low-authority autonomous steering control of the steering system for a predetermined time period in response to receiving the request to exit autonomous steering control, the low-authority autonomous steering control allowing an operator to directly take over steering control; and
exiting, by the one or more computing devices, the low-authority autonomous steering control and enabling manual steering control of a manual input device of the steering system when at least one of another request to exit autonomous steering control is received before the predetermined time period elapses or an input from a braking system of the vehicle is received.

7. The method of claim 6, wherein the request to exit autonomous steering control is generated based at least in part on data received from at least one sensor of the steering system.

8. The method of claim 7, wherein the data from the at least one sensor is indicative of at least one of contact of a steering wheel of the steering system by an operator or a torque applied to the steering wheel by the operator.

9. The method of claim 8, wherein an external input to one or more wheels of the vehicle is detected by the at least one sensor as an input indicative of contact of the steering wheel or torque applied to the steering wheel by the operator, the external input being applied by a surface across which the one or more wheels travels.

10. The method of claim 6, further comprising transitioning, by the one or more computing devices, to the high-authority autonomous steering control from the low-authority autonomous steering control of the steering system when the predetermined time period elapses without receiving another request to exit autonomous steering control.

11. The method of claim 6, further comprising monitoring, by the one or more computing devices, an actual performance of the steering system in comparison to an expected performance range of the steering system in response to a command by an autonomous controller during high-authority autonomous steering control, wherein the request to exit autonomous steering control is received in response to the actual performance of the steering system being outside of the expected performance range.

12. The method of claim 11, further comprising exiting, by the one or more computing devices, the low-authority autonomous steering control and enabling manual steering control of a manual input device of the steering system when the predetermined time period elapses.

13. The method of claim 6, further comprising monitoring, by the one or more computing devices, a distance travelled by the vehicle only during high-authority autonomous steering control and during low-authority autonomous steering control.

14. The method of claim 6, further comprising detecting, by the one or more computing devices, a loss of communication with an external controller; and
performing, by the one or more computing devices, a predetermined reaction based at least in part on the loss of communication.

15. The method of claim 14, wherein the predetermined reaction comprises transitioning from the high-authority autonomous steering control to a semi-autonomous steering control mode of the steering system, exiting the low-authority autonomous steering control and enabling manual steering control of a manual input device of the steering system, or transitioning from the high-authority autonomous steering control to a low-authority autonomous steering control of the steering system holding a last commanded steering position.

16. A computing system for controlling a steering system of a vehicle during an autonomous steering development mode, comprising:
one or more processors; and
one or more memory devices, the one or more memory devices storing instructions that, when executed by the one or more processors, configure the computing system to:
perform high-authority autonomous steering control of a steering system of the vehicle, the high-authority autonomous steering control preventing an operator from directly taking over steering control;
receive an input from at least one sensor of the steering system indicative of manual operation of the steering system by an operator of the vehicle;
transition from the high-authority autonomous steering control to a low-authority autonomous steering control of the steering system for a predetermined time period in response to receiving the input from the at least one sensor, the low-authority autonomous steering control allowing an operator to directly take over steering control; and
exit the low-authority autonomous steering control and enable manual steering control of a manual input device of the steering system when at least one of another input from the at least one sensor of the steering system indicative of manual operation of the steering system by an operator of the vehicle is received before the predetermined time period elapses or an input from a braking system of the vehicle is received.

17. The computing system of claim 16, wherein the computing system is further configured to transition to the high-authority autonomous steering control from the low-authority autonomous steering control of the steering system when the predetermined time period elapses without receiving another request to exit autonomous steering control.

18. A vehicle comprising the computing system of claim 16.

* * * * *